US010136011B2

(12) United States Patent
Pashintsev et al.

(10) Patent No.: US 10,136,011 B2
(45) Date of Patent: Nov. 20, 2018

(54) AUTOMATIC SCANNING OF DOCUMENT STACK WITH A CAMERA

(71) Applicant: EVERNOTE CORPORATION, Redwood City, CA (US)

(72) Inventors: Alexander Pashintsev, Cupertino, CA (US); Boris Gorbatov, Sunnyvale, CA (US); Eugene Livshitz, Moscow (RU)

(73) Assignee: EVERNOTE CORPORATION, Redwood City, CA (US)

( * ) Notice: Subject to any disclaimer, the term of this patent is extended or adjusted under 35 U.S.C. 154(b) by 0 days.

(21) Appl. No.: 15/438,625

(22) Filed: Feb. 21, 2017

(65) Prior Publication Data

US 2017/0346976 A1 Nov. 30, 2017

Related U.S. Application Data

(63) Continuation of application No. 15/002,444, filed on Jan. 21, 2016, now Pat. No. 9,578,195.

(60) Provisional application No. 62/106,771, filed on Jan. 23, 2015.

(51) Int. Cl.
*H04N 1/04* (2006.01)
*H04N 1/00* (2006.01)

(52) U.S. Cl.
CPC ..... *H04N 1/00782* (2013.01); *H04N 1/00251* (2013.01); *H04N 1/00689* (2013.01); *H04N 2201/0084* (2013.01); *H04N 2201/0096* (2013.01)

(58) Field of Classification Search
CPC ........... H04N 1/00782; H04N 1/00251; H04N 1/00689

USPC ................................. 358/473, 474, 498, 497
See application file for complete search history.

(56) References Cited

U.S. PATENT DOCUMENTS

| 9,578,195 B1 * | 2/2017 | Pashintsev | H04N 1/00782 |
| 2003/0165276 A1 * | 9/2003 | Seeger | G06K 9/00993 |
| | | | 382/278 |
| 2006/0291004 A1 * | 12/2006 | Dymetman | H04N 1/00795 |
| | | | 358/474 |

(Continued)

OTHER PUBLICATIONS

Pashintsev, Office Action, U.S. Appl. No. 15/002,444, dated Jun. 15, 2016, 7 pgs.

(Continued)

*Primary Examiner* — Houshang Safaipour
(74) *Attorney, Agent, or Firm* — Morgan, Lewis & Bockius LLP

(57) ABSTRACT

Automatically scanning multiple document sheets with a camera includes receiving a video stream while the camera is pointed at the multiple document sheets, detecting presence of a first top page of the multiple document sheets based on the video stream, taking a still photograph of the first top page in response to detecting presence of the first top page, detecting presence of a second top page based on the video stream by confirming that the second top page is different from the first top page and by waiting a predetermined amount of time for an image of the second top page to stabilize, and taking a still photograph of the second top page in response to detecting presence of the second top page. Detecting the pages may include determining that the camera is pointing at the stack of documents and a detected page is not obstructed.

17 Claims, 4 Drawing Sheets

(56) References Cited

U.S. PATENT DOCUMENTS

2007/0292026 A1* 12/2007 Reznik .................. G06K 9/036
                                                    382/176
2015/0026074 A1* 1/2015 Cotten ................. G06Q 30/012
                                                    705/302

OTHER PUBLICATIONS

Pashintsev, Notice of Allowance, U.S. Appl. No. 15/002,444, dated Nov. 8, 2016, 8 pgs.

* cited by examiner

AUTOMATIC SCANNING OF DOCUMENT STACK WITH A CAMERA

CROSS-REFERENCE TO RELATED APPLICATIONS

This application is a continuation of U.S. patent application Ser. No. 15/002,444, entitled "AUTOMATIC SCANNING OF DOCUMENT STACK WITH A CAMERA," filed on Jan. 21, 2016, which claims priority to U.S. Prov. App. No. 62/106,771, filed on Jan. 23, 2015, and entitled "AUTOMATIC SCANNING OF DOCUMENT STACK WITH A CAMERA", both of which are incorporated herein by reference.

TECHNICAL FIELD

This application is directed to the field of capturing, analyzing and managing information and user interfaces, and more particularly to the field of capturing, analyzing and managing information and user interfaces in connection with obtaining and processing photographic images of multiple document sheets arranged in a stack where a user manually changes the sequence of scanned sheets.

BACKGROUND OF THE INVENTION

Mobile phones with digital cameras are broadly available in every worldwide market. According to market statistics and forecasts, within the five-year period 2014-2018, annual smartphone shipments are expected to grow from 1.28 to 1.87 billion units; over 80% of all mobile phones will be arriving to customers with embedded digital cameras. New shipments of smartphones will expand the already massive current audience of approximately 4.5 billion mobile phone users and 6.7 billion mobile subscribers; these shipments will also cause significant upgrades of mobile phones currently used by the subscribers. Annual sales of phone cameras to mobile phone manufacturers for embedding into smartphones and feature phones are projected to exceed 1.5 billion units.

The volume of photographs taken with phone cameras is growing rapidly. According to Pew Research, photographing with phone cameras has evolved into the single most popular activity of smartphone owners; poll data shows that photographs are taken by 82% of camera phone users, exceeding even the second most popular activity, texting, which is utilized by 80% of phone owners. According to recent studies, about 27% of all photographs have been taken with smartphones, and smartphone photographs have exceeded photographs taken with any other equipment on major social photo sharing sites.

Hundreds of millions smartphone users are increasingly blending their everyday work and home digital lifestyles based on mobile phones and/or tablets with co-existing paper habits. Paper documents retain a significant role in the everyday information flow of business users and households. Digitizing and capturing paper based information has become even more ubiquitous since the arrival of unified multi-platform content management systems, such as the Evernote service and software developed by Evernote Corporation of Redwood City, Calif., which is aimed at capturing, storing, displaying and modifying all types of information across multiple user devices. Many types of printed and handwritten documents are benefiting from digital capturing and availability in electronic document formats, including pages from books and magazines, printed newspaper articles, receipts, invoices and checks, tax, applications and other forms, printed reports, business cards, handwritten notes and memos on legal pads, in specialized Moleskine notebooks or on sticky notes or easels, and many other types of printed and handwritten documents.

Modern scanners offer solutions for some of these information capturing needs. Accordingly, unit volumes of mobile scanners are expected to grow from approximately one million to two million in the next five years. However, the mobile lifestyle of workforce and consumers is increasingly conflicting with scanner-friendly environments and often requires capturing documents or portions thereof under random conditions where users may not have access to their office or home scanners. These requirements and usage restrictions are increasingly stimulating a development of smartphone based document capturing solutions, such as remote check deposit software solutions deployed by various online banking systems or the Scannable software application for iPhone and iPad provided by Evernote. A new breed of document capturing applications for smartphones includes advanced algorithms for lighting, color and shape corrections, page border detection, contrast optimization, noise removal and other features aimed at creating optimized images of photographed documents nearing stationary scan quality.

One challenging aspect of smartphone based scanning solutions is a batch scanning of stacks of document pages, capturing multiple pages of a book and other multiple page scanning sessions. Unlike conventional scanners, phone cameras don't have auto-feeders and their efficient use for capturing multiple pages of content requires special technologies and workflow.

Accordingly, it would be useful to develop efficient mechanisms for batch capturing of multiple pages of documents and other content with phone cameras, where users may quickly expose subsequent pages by moving away already captured sheets or turning pages of a book, followed by an appropriate capturing routine controlled by the smartphone software.

SUMMARY OF THE INVENTION

According to the system described herein, automatically scanning multiple document sheets with a camera includes receiving a video stream while the camera is pointed at the multiple document sheets, detecting presence of a first top page of the multiple document sheets based on the video stream, taking a still photograph of the first top page in response to detecting presence of the first top page, detecting presence of a second top page based on the video stream by confirming that the second top page is different from the first top page and by waiting a predetermined amount of time for an image of the second top page to stabilize, and taking a still photograph of the second top page in response to detecting presence of the second top page. Detecting the pages may include determining that the camera is pointing at the stack of documents and a detected page is not obstructed. Digital images from the still photographs may be combined to provide image data corresponding to the multiple document sheets. The multiple document sheets may be a stack of documents. The second top page may be detected after a user removes from the stack a sheet corresponding to the first top page. The second top page may be detected after a user adds to the stack a sheet corresponding to the second top page. The multiple document sheets may be pages of a book. The second top page may be detected after a user turns a page corresponding to the first top page. The camera may be part of a smartphone. Automatically scanning multiple document sheets with a camera may also include displaying status information to a user on a screen of the smartphone. The status information may be: not obstructed and ready for capturing, overlapping views, or clean view for insufficient time period.

According further to the system described herein, a non-transitory computer-readable medium contains software that automatically scans multiple document sheets with a camera. The software includes executable code that receives a video stream while the camera is pointed at the multiple document sheets, executable code that detects presence of a first top page of the multiple document sheets based on the video stream, executable code that takes a still photograph of the first top page in response to detecting presence of the first top page, executable code that detects presence of a second top page based on the video stream by confirming that the second top page is different from the first top page and by waiting a predetermined amount of time for an image of the second top page to stabilize, and executable code that takes a still photograph of the second top page in response to detecting presence of the second top page. Executable code that detects the pages may determine that the camera is pointing at the stack of documents and a detected page is not obstructed. Digital images from the still photographs may be combined to provide image data corresponding to the multiple document sheets. The multiple document sheets may be a stack of documents. The second top page may be detected after a user removes from the stack a sheet corresponding to the first top page. The second top page may be detected after a user adds to the stack a sheet corresponding to the second top page. The multiple document sheets may be pages of a book. The second top page may be detected after a user turns a page corresponding to the first top page. The camera may be part of a smartphone. The software may also include executable code that displays status information to a user on a screen of the smartphone. The status information may be: not obstructed and ready for capturing, overlapping views, or clean view for insufficient time period.

The proposed system offers a semi-automatic capture of streams of multiple document sheets with a phone camera or other type of camera held by a user or fixed by some device to point at a current document, where the streams may include unbounded stacks of documents, multiple pages of a stitched book, etc. The system may automatically take still shots of subsequent pages appearing on top of an unbounded stack or on a current book page, appropriately positioned and/or exposed by a user; the system relies on pre-processing of intermediate scene views in a video preview mode and on monitoring a criteria for capturing a new page in selecting views and timestamps for clean still shots.

The system may be capable of detecting document pages in a preview video stream based on contrast between the pages and the background, identification of page boundaries and corners, and other techniques. Because of perspective distortions, bending and other factors, raw document pages detected in the sequence of preview frames may not be rectangular after the raw document pages are initially captured, but the raw document pages may be subsequently processed with perspective correction and other cleanup mechanisms to provide final images approaching or exceeding conventional scanner quality, as described in U.S. Pat. No. 9,213,917 titled: "USING SURFACES WITH PRINTED PATTERNS FOR IMAGE AND DATA PROCESSING", issued on Dec. 15, 2015 to Pashintsev, et al. and incorporated by reference herein, and in U.S. patent application Ser. No. 14/881,617 titled: "GLARE MITIGATION FOR DYNAMIC DOCUMENT SCANNING", filed on Oct. 13, 2015 by Pashintsev, et al. and incorporated by reference herein.

System functioning with a stack of document sheets, book pages or other stream of multiple pages (hereinafter, a stack) starts when a user aims a smartphone camera at or otherwise causes a smartphone camera to point to (e.g., using a mounting device) the top of the stack with both the stack and the camera being reasonably fixed. The system may then perform the following steps:

Preprocesses video flow of the scene.
Detects the top page in the stack.
Takes a still shot of the top page.
Processes the page and add the processed page image as the start of the new digital stack.
Displays stack status information (possibly with the image of the captured top page) to the user.

Then, the system may switch back into the video preview mode and track the state of the stack.

As soon as the user changes the top view of the stack, for example, by pulling a top sheet to expose the next sheet below it, by turning a book page, by adding a new document page on top of the stack, etc., the system may identify the changes and continue monitoring the changes using fast processing techniques, such as identification of a document page in the preview frames and tracking position of the document page within a frame. Subsequently, a first condition, or criterion, for capturing the next still photo of a document page in a stack may require a change that removes the previously captured page from the preview mode.

It should be noted that the user may be exposing subsequent pages of an unbounded set at least in two different ways (orders of scanned pages):
  (i) by starting with a fully formed stack of pages of a document, first to last, positioned in the camera view and removing scanned pages from the top of the stack until the last page is reached and scanned;
  (ii) by starting with the last page of the document positioned in the camera view and adding pages, last to first, to the top of the stack until the first page is reached and scanned.

Once the user stops modifying the stack, the system may assess stability of the preview scene (for example, the absence of all but minor fluctuations, such as may be caused by a natural hand jitter). Then, the system may apply additional criteria to determine whether the new document page is ready for capturing. Such additional conditions for capturing a new still photo may include:
  A sufficient period of presence of a stable, unchanged image in the preview mode. The time span for the stable scene condition should significantly exceed the sampling rate for tracking changes in the stack scene. For example, if the default sampling period for tracking stack changes is set to 0.2 sec, the stability period triggering a new still photo may be one full second.
  An identifiable document page within the current stack scene. There must be a well-defined document page in the stable scene, ready for capturing it with a camera. This condition may not always hold through the stack capturing process. For example,
    the stack may end or may be temporarily removed, so that actual document pages may be replaced with a generic background in the preview mode of the smartphone;

the user may partially shift the previous top stack page and leave the previous top stack page in an intermediate position while pausing the capturing work (e.g., because of a distraction);

the user may change camera aiming and shift the from the current stack; etc.

A different new page. The identified new document page should be different from the previously captured page. Indeed, the user may temporarily shift the top page to look at the next page and then return the top page back before proceeding with the stack scanning. For example, such a situation may occur if the user has realized, after partially shifting the top page, that the needed second page in the stack was missing and the current second page was unfit. In such a case, the user may return the top page to an original position thereof and look around for the actual second page. In this case, if the user continued aiming the camera at the existing stack, there would be no need for the system to re-capture the first page, even though all previous capturing criteria have been met.

Therefore, once the rest of the criteria for re-capturing a new page have been fulfilled, the system may compare the newly identified top page of the stack with the previously captured page and make a new still shot only if significant differences between the two images have been found.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for a semi-automatic dynamic batch capturing of stacks of document pages using a smartphone camera, where sheets or pages are changed by the user, while the system automatically identifies clean views of new pages, takes and processes appropriate still shots, merges the still shots in a single electronic copy and presents a result thereof to the user.

Figure 1:
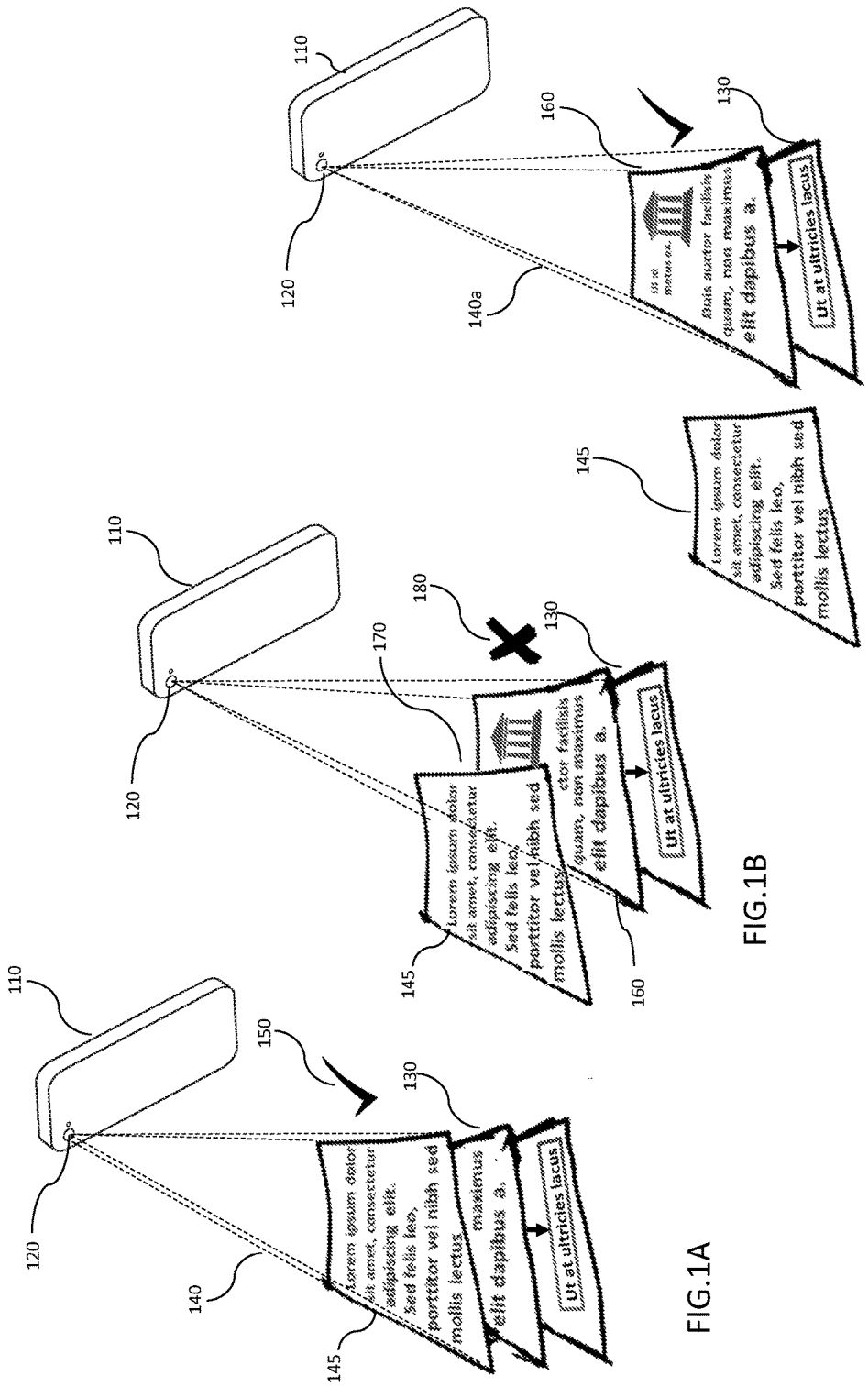
FIGS. 1A-1C are a schematic illustration of stack scanning with a smartphone camera, according to an embodiment of the system described herein.
Figure 2:
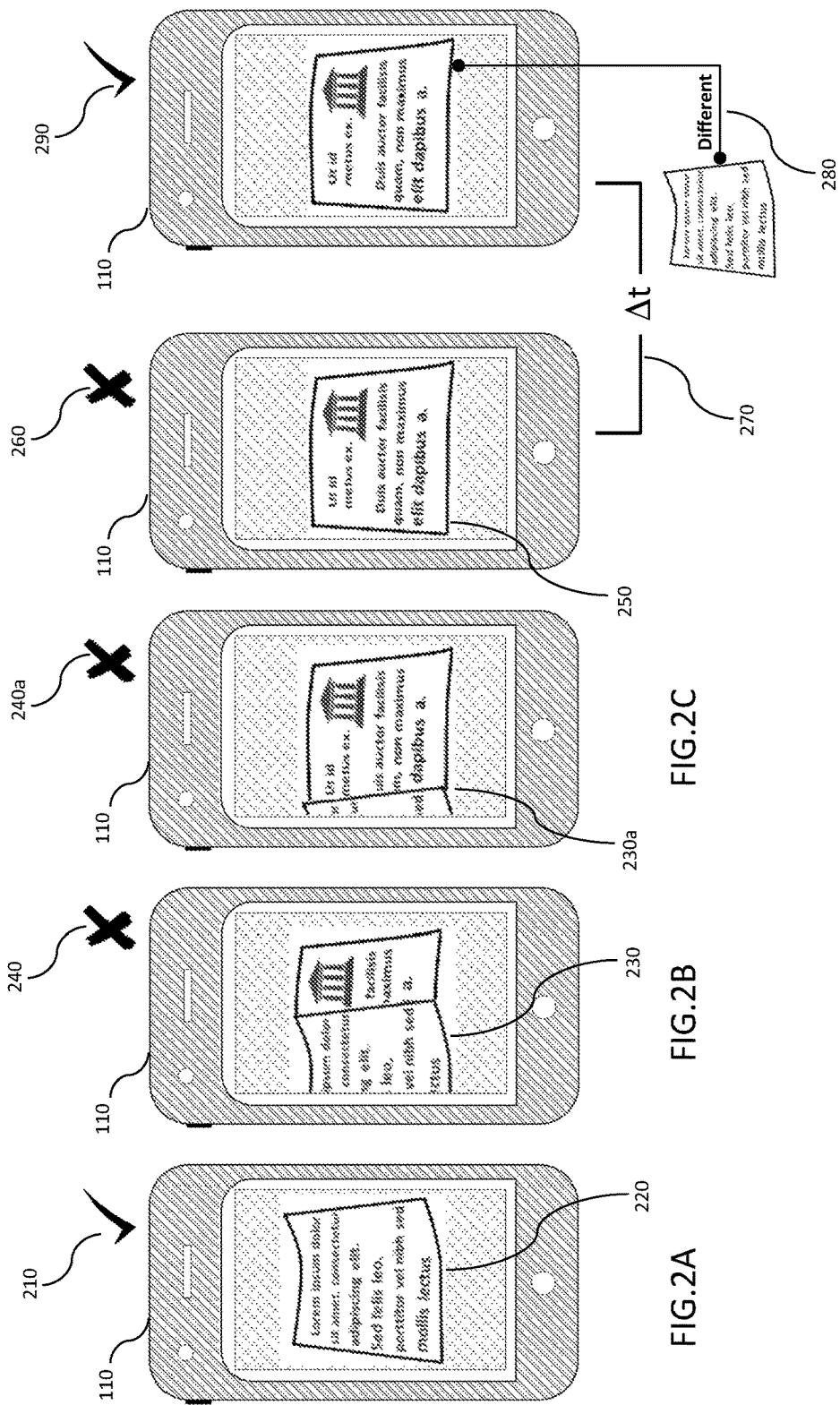
FIGS. 2A-2D are a schematic illustration of criteria for capturing still photos of subsequent stack pages, according to an embodiment of the system described herein.

FIG. 1A is a schematic illustration of stack scanning with a smartphone camera. A smartphone 110 with an embedded camera 120 is aimed by a user at an unbounded stack of document sheets 130. A particular configuration of the stack 130 and the camera 120 illustrated in the left part of FIG. 1 is such that the camera 120 has a clean view 140 of the stack 130 where a top sheet 145 in the stack 130 occupies a preview area of the camera 120 and does not interfere with partial views of underlying sheets (or such interference is insignificant and the top sheet can be clearly identified in a solid unobstructed portion of the preview area). Based on the clear view 140, the system takes the photograph of the top sheet 145, as symbolically illustrated by a checkmark 150, and initiates the new digital stack in system memory and on a display of the smartphone 110 by entering a first page of image data corresponding to the stack 130, as explained elsewhere herein.

After the digital stack has been initiated, the user may start shifting the top sheet 145 aside from the stack to expose a next sheet 160 for capturing, as illustrated by FIG. 1B. Partially shifting the top sheet 145 may temporarily create an overlapping view 170, where an already captured sheet interferes with a new top sheet in the stack 130 and obstructs a view of the new top sheet 160 in the preview area of the camera 120. The system is capable of identifying such overlapping views, as explained elsewhere herein, and may refrain from taking a new still shot of the top of the stack 130 when an overlapping view is detected, as illustrated by a rejection sign 180.

Once the previous top sheet 145 has been fully moved aside from the stack 130, occupying a position that does not obstruct a view of the rest of the stack 130, the system may detect a new clear view 140a of the stack 130, with the new top sheet 160 and, subject to conditions explained elsewhere herein, may take a new still shot of the stack to add the image of the sheet 160 to the image data corresponding to the stack 130, as explained elsewhere herein.

FIGS. 2A-2D are a schematic illustration of criteria for capturing still photos of subsequent stack pages. The criteria are shown on a screen of the smartphone 110 as the criteria may be presented to a user. An image 220 illustrates a preview (in camera preview mode) of a first sheet in a stack in a clear view mode when the image 220 is not obstructed and is ready for capturing, as illustrated by a checkmark 210. Two subsequent preview images 230, 230a illustrate moving a top sheet out from a stack surface. Both of the images 230, 230a represent overlapping views when an image of a next sheet cannot be captured, as shown by rejection signs 240, 240a. A next image 250 illustrates a clean view reached right after the previous top sheet has disappeared from the preview area of the camera of the smartphone 110. While the new image may be categorized as an identifiable document page within a current stack scene, it may be too early to judge if the image 250 justifies a new still shot and addition to the image data corresponding to the stack and so instant capturing in FIG. 2 is rejected, as shown by a sign 260. According to criteria explained elsewhere herein, a preview image is determined to be in a stable condition for a sufficient time period 270, and the system checks that the stable preview image of a paper sheet does not coincide with any of the previously captured sheets in a digital stack, as schematically shown by a comparison 280. Provided both the time period 270 and the comparison 280 are satisfied, the system may take a new still shot, as indicated by a checkmark 290.

Figure 3:
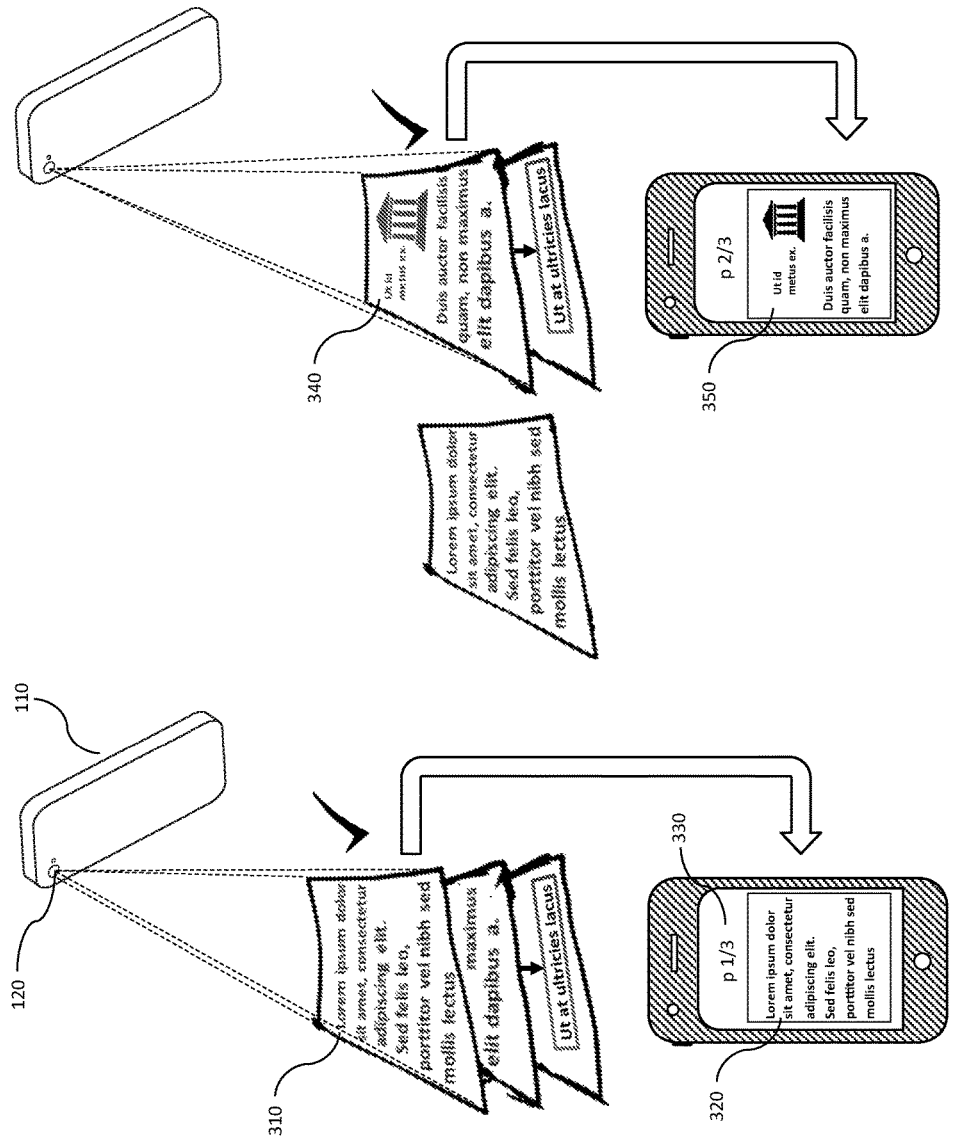
FIGS. 3A and 3B are a schematic illustration of processing captured still images of stack pages, according to an embodiment of the system described herein.

FIGS. 3A and 3B are a schematic illustration of processing captured still images of stack pages. Software running on the smartphone 110 with the camera 120 implements the system described herein and takes a still photograph of a top sheet 310 in a stack, following pre-processing of the camera views in a preview area, as described elsewhere herein. The software may perform perspective and color correction, dewarping, binarization and other processing of an image, as explained elsewhere herein, and may enter a processed image 320 into the regular software view (not preview) of the image data corresponding to the stack. The software may display accompanying information, such as a heading 330, indicating a position of the current page in the stack. (Note that the page indicator 330 in FIG. 3 displays the total number of pages in the image data corresponding to the stack (three pages), which may be entered by the user at the start of any other moment of capturing and may or may not be automatically calculated by the system when the image data corresponding to the stack is captured progressively until the system captures the very last sheet.

Analogously, when a top sheet of a stack has been removed and all criteria are satisfied for capturing a next top sheet 340, as explained elsewhere herein, the system may take a still shot of the top sheet 340, process the still shot and add the still shot to the image data corresponding to the stack, displaying a processed image 350 to the user and updating a page indicator.

Figure 4:
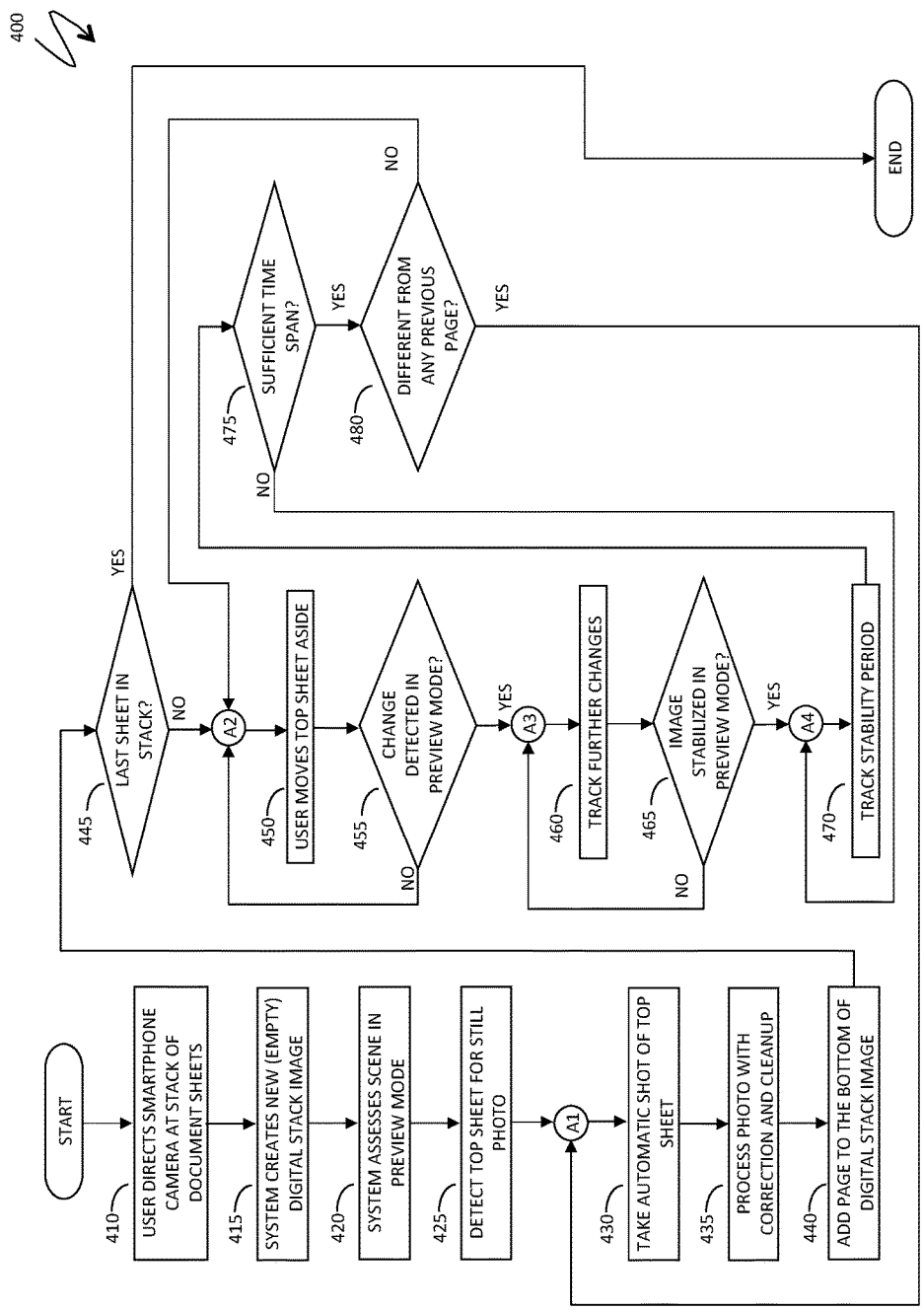
FIG. 4 is a system flow diagram illustrating batch capturing of a paper stack, according to an embodiment of the system described herein.

Referring to FIG. 4, a system flow diagram 400 illustrates processing in connection with batch capturing of a paper stack. Processing begins at a step 410 where a user directs a smartphone camera at a stack of document sheets, which may be an unbounded stack, a book, a brochure or another form of a stream of multiple sheets or pages, as explained elsewhere herein. After the step 410, processing proceeds to a step 415, where the system creates a new empty image data instance corresponding to the stack to start capturing the sheets of the paper stack. After the step 415, processing proceeds to a step 420, where the system assesses a scene in camera preview mode. After the step 420, processing proceeds to a step 425, where the system detects a top sheet of the stack for taking a still photograph (an assumption is made that the detected top sheet satisfies all conditions for immediate capturing, as explained elsewhere herein).

After the step 425, processing proceeds to a step 430, where the system takes an automatic still shot of the top sheet. After the step 430, processing proceeds to a step 435, where the system processes the photograph taken at a previous step 430, performing correction and cleanup, as explained elsewhere herein. After the step 435, processing proceeds to a step 440, where the system adds the image of the new page to the bottom of the image data corresponding to the stack (so that the sheet at the very bottom, which presumably is captured last, after all sheets on top of the new sheet are removed from the stack, will become the last page of the image data corresponding to the stack). After the step 440, processing proceeds to a test step 445, where it is determined whether the just captured sheet is the last sheet in the physical stack. If so, processing is complete; otherwise, processing proceeds to a step 450, where the user moves the top sheet aside (by removing the top sheet from the top of an unbounded stack; by turning a page in a book; or otherwise).

After the step 450, processing proceeds to a test step 455, where it is determined whether changes have been detected in the preview mode (i.e. the top sheet has been moved enough from the top of the physical stack to register in the system as an overlapping mode, as explained elsewhere herein). If not, processing proceeds back to the step 450; otherwise, processing proceeds to a step 460 to track further changes. After the step 460, processing proceeds to the test step 465, where it is determined whether the image has stabilized in the preview mode (which is a condition for capturing a next still photograph, as explained elsewhere herein). If not, processing proceeds back to the step 460 to track subsequent changes in the image of the physical stack; otherwise, processing proceeds to a step 470 where the system tracks and updates stability period for the image in the preview area of the smartphone. After the step 470, processing proceeds to a test step 475, where it is determined whether there has been a sufficient time span for a stability period. If not, processing proceeds back to the step 470 to continue tracking the stability period; otherwise, processing proceeds to a test step 480, where it is determined whether the current page image is different from any previous page image capturing in the process of creating the present digital image data corresponding to the stack. If so, processing proceeds back to the step 430 to add the new page to the image data corresponding to the stack; otherwise (the sheet has already been captured and then has been returned to the physical stack to become the current page image), processing proceeds back to the step 450 to let the user move the already captured top sheet aside.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions. The smartphone may include software that is pre-loaded with the device, installed from an app store, installed from a desktop (after possibly being pre-loaded thereon), installed from media such as a CD, DVD, etc., and/or downloaded from a Web site. The smartphone 110 may use an operating system selected from the group consisting of: iOS, Android OS, Windows Phone OS, Blackberry OS and mobile versions of Linux OS. The smartphone 110 may be connected by various types of wireless and other connections, such as cellular connections in Wide Area Networks, Wi-Fi, Bluetooth, NFC, USB, infrared, ultrasound and other types of connections. A mobile device other than a smartphone may be used. Note that the system described herein may be used with other devices capable of taking a photograph and providing appropriate feedback to a user, such as a wireless digital camera with a screen for providing messages to the user and a mechanism for providing an intermediate image stream.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for scanning pages of a multi-page document, the method comprising:

at an electronic device with a camera:

capturing, by the camera, a series of images;
determining, using one or more subsets of the series of images, wherein at least one of the one or more subsets of the series of images includes a plurality of images, whether a respective page of the multi-page document meets capture criteria, wherein the determination that the respective page of the multi-page document meets the capture criteria includes:
determining that the respective page of the multipage document meets stability criteria, and
determining that a view of the respective page of the multipage document meets visibility criteria, including determining that the respective page is not obstructed by another page;
in accordance with a determination that the respective page of the multi-page document meets the capture criteria, storing a respective image captured by the camera as a first stored page image of the multi-page document; and
in accordance with a determination that the respective page of the multi-page document does not meet the capture criteria:
capturing, by the camera, at least one additional image of the multi-page document, and
repeating the determining, using the one or subsets of the series of images, whether the respective page of the multi-page document meets the capture criteria.

2. The method of claim 1, wherein the respective image captured by the camera is an image from the series of images.

3. The method of claim 1, wherein the series of images are frames of a video stream.

4. The method of claim 1, wherein the determination that a view of the respective page of the multipage document meets the visibility criteria includes at least one of:
determining that a contrast between the respective page and a background meets contrast criteria; and
determining that one or more identified page boundaries meet page boundary criteria.

5. The method of claim 1, wherein the determination that the respective page of the multi-page document meets the capture criteria includes determining that the respective page is distinct from a previously stored page image of a previous page of the multi-page document.

6. The method of claim 1, wherein the determination that the respective page of the multipage document meets the stability criteria includes determining that a position of the respective page within the image frame of a subset of the images does not move by more than a threshold amount.

7. The method of claim 1, wherein the determination that the respective page of the multipage document meets the stability criteria includes determining that, during a predetermined period of time, movement of the respective page does not increase beyond a threshold amount.

8. The method of claim 7, wherein the predetermined period of time is at least five times a sample period from a first time at which first image of the series of images was captured to a second time at which a subsequent image of the series of images was captured.

9. The method of claim 1, including, in accordance with a determination that the respective page of the multi-page document does not meet the capture criteria, displaying, via a di splay of the electronic device, status information.

10. The method of claim 9, wherein the status information includes a captured image from the series of images.

11. The method of claim 1, including, prior to capturing the series of images, generating an empty image data instance for storing page images of the multi-page document.

12. A non-transitory computer readable storage medium storing one or more programs, the one or more programs comprising instructions, which, when executed by an electronic device with a camera, cause the system to:
capture, by the camera, a series of images;
determine, using one or more subsets of the series of images, wherein at least one of the one or more subsets of the series of images includes a plurality of images, whether a respective page of the multi-page document meets capture criteria, wherein the determination that the respective page of the multi-page document meets the capture criteria includes:
determining that the respective page of the multipage document meets stability criteria, and
determining that a view of the respective page of the multipage document meets visibility criteria, including determining that the respective page is not obstructed by another page;
in accordance with a determination that the respective page of the multi-page document meets the capture criteria, store a respective image captured by the camera as a first stored page image of the multi-page document; and
in accordance with a determination that the respective page of the multi-page document does not meet the capture criteria:
capture, by the camera, at least one additional image of the multi-page document, and
repeat the determining, using the one or subsets of the series of images, whether the respective page of the multi-page document meets the capture criteria.

13. The non-transitory computer-readable storage medium of claim 12, wherein the determination that the respective page of the multi-page document meets the capture criteria includes determining that the respective page is distinct from a previously stored page image of a previous page of the multi-page document.

14. The non-transitory computer-readable storage medium of claim 12, wherein the determination that the respective page of the multipage document meets stability criteria includes determining that, during a predetermined period of time, movement of the respective page does not increase beyond a threshold amount.

15. An electronic device, comprising:
memory;
one or more processors;
a camera; and
one or more programs, wherein the one or more programs are stored in the memory and configured to be executed by the one or more processors, the one or more programs including instructions for:
capturing, by the camera, a series of images;
determining, using one or more subsets of the series of images, wherein at least one of the one or more subsets of the series of images includes a plurality of images, whether a respective page of the multi-page document meets capture criteria, wherein the determination that the respective page of the multi-page document meets the capture criteria includes:
determining that the respective page of the multipage document meets stability criteria, and
determining that a view of the respective page of the multipage document meets visibility criteria, including determining that the respective page is not obstructed by another page;

in accordance with a determination that the respective page of the multi-page document meets the capture criteria, storing a respective image captured by the camera as a first stored page image of the multi-page document; and in accordance with a determination that the respective page of the multi-page document does not meet the capture criteria:

capturing, by the camera, at least one additional image of the multi-page document; and repeating the determining, using the one or subsets of the series of images, whether the respective page of the multi-page document meets the capture criteria.

16. The electronic device of claim 15, wherein:

the electronic device includes a display; and the one or more programs include instructions for, in accordance with a determination that the respective page of the multi-page document does not meet the capture criteria, displaying, via the display, status information.

17. The electronic device of claim 16, wherein the status information includes a captured image from the series of images.

* * * * *